> 3,475,353
> AMIDE-EPOXIDE COMPOSITIONS
> Hugh A. Farber, Midland, Mich., assignor to The Dow
>   Chemical Company, Midland, Mich., a corporation of
>   Delaware
> No Drawing. Filed Aug. 26, 1965, Ser. No. 482,884
>   Int. Cl. C08g 30/14, 22/14, 45/10
> U.S. Cl. 260—2                                 9 Claims

ABSTRACT OF THE DISCLOSURE

The reaction of a diepoxide with an amide in equimolar quantities produces a novel composition having pendant hydroxyl groups available for cross-linking with polyisocyanates, melamine, etc. Amides include both aliphatic and aromatic sulfonamides or carboxylic acid amides.

---

This invention relates to new compositions of matter, and more particularly, to the novel reaction products derived from the copolymerization of sulfonamides and carboxylic acid amides with diepoxides.

Sulfonamide-epoxide compositions are known in the art. As an example, U.S. Patent 2,712,001, to Greenlee, teaches the reaction between complex polyepoxides and aromatic sulfonamides, where the number of hydrogens attached to nitrogen of the sulfonamide is substantially less than the number of epoxide groups of the resinous epoxide. Such reaction products obviously possess sulfonamide groups scattered randomly along a polyepoxide chain in a proportion substantially less than the epoxides in the chain.

U.S. Patent 2,494,295, to Greenlee, describes a resinous reaction product derived from epoxides and aromatic sulfonamide-aldehyde condensates.

It has now been discovered that novel compositions are obtained by reacting equimolar quantities of a diepoxide and an amide comprising aliphatic and aromatic sulfonamides and carboxylic acid amides, that provide pendant hydroxyl groups available for cross-linking with such hydroxyl-reactive compounds as melamines and polyisocyanates. The resultant cross-linked compositions are tough, solvent resistant coating materials that exhibit excellent adhesion to metal surfaces.

The novel amide-epoxy compositions of the present invention are prepared by reacting together equimolar quantities of (1) an epoxide selected from the group consisting of the diglycidyl polyether of polyhydric phenols, the diglycidyl polyether of polyalkylene oxides, m-diisopropylbenzene diepoxide, divinylbenzene diepoxide, and vinylcyclohexane dioxide, and (2) an amide comprising aliphatic and aromatic carboxylic acid amides and sulfonamides, in the presence of an alkaline or Lewis acid catalyst.

The sulfonamides useful in making the novel compositions are preferably aromatic sulfonamides, such as those of the benzene and naphthalene series, including benzene sulfonamide, toluene sulfonamides (o-, p-, and m-), naphthalene sulfonamides, and the like, including aromatic monosulfonamides and disulfonamides. If aromatic monosulfonamides are used, the amido-nitrogen must possess two reactive hydrogens. Disulfonamides may be used that possess secondary hydrogen atoms attached to the amido-nitrogen. A particularly advantageous sulfonamide for use in making the novel compositions is benzene sulfonamide. Aliphatic sulfonamides are also useful in the preparation of the novel amide-epoxide compositions.

The aliphatic and aromatic carboxylic acid amides useful in preparing the novel amide-epoxide compositions have the general formula

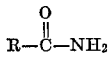

where R is selected from the group consisting of 1 to 4 C atom chain alkyl or aryl, and where R may have attached thereto electron withdrawing groups such as —NO$_2$, —CN, and halogen. Suitable carboxylic acid amides are p-nitrobenzamide, p-cyanobenzamide, alpha-chloroacetamide, and cyanoacetamide. Generally, the corresponding carboxylic acids of the carboxylic acid amides, having the above general formula, should have an ionization constant (pKa) of about 5.2 or lower. Carboxylic acid amides conforming to the above specifications are well known to the art and are commercially available. A particularly suitable carboxylic acid amide is alpha-chlorocetamide.

Both hydrogens directly attached to nitrogen of the sulfonamides are active hydrogens in reacting with epoxide groups. It has been found to be advantageous to use a catalyst in preparing the amide-epoxide compositions. Alkaline and Lewis acid type catalysts are effective in promoting the reaction of the epoxide groups with the amides. Particularly effective catalysts are sodium hydroxide and aluminum chloride.

The epoxides used with the amides are preferably diepoxides, that is, they should possess at least two terminal epoxide groups. Diepoxides that have proven to be particularly useful are the diglycidyl polyether of 2,2-bis(4-hydroxyphenyl) propane having an equivalent weight of 172 to 178, diglycidyl polyethers of propylene glycol having epoxy equivalent weights of 175 to 205 and 305 to 335, m-diisopropenylbenzene diepoxide, divinylbenzene diepoxide, and vinylcyclohexene dioxide.

In referring to equivalent amounts of amide and diepoxide, each active hydogen attached to nitrogen of the amide is considered equivalent to one epoxide group. The equivalent weight of the amide is the weight which will contain one such active amide hydrogen when used with the equivalent weight of the complex epoxides containing one epoxide group. Thus, when an equimolar, or equivalent, amount of amide and epoxide are used in the present invention, there should be one active hydrogen on the amido-nitrogen for each epoxide group.

The following example is illustrative of the present invention and is not intended to limit the scope thereof.

A 500 cc. reaction vessel, fitted with a stirrer and water-cooled condenser, was charged with 179 grams (0.5 mole) of a diglycidyl polyether of polypropylene glycol having an epoxy equivalent weight of 175–205, 78.5 grams (0.5 mole) of benzene sulfonamide and 2.6 grams of powdered sodium hydroxide, as a catalyst. During the first hour, cooling was used to moderate the reaction at 100° to 120° C. At the end of this hour, less than 1 percent of the diepoxide remained unreacted. The yield was quantitative and a hydroxyl analysis agreed closely with theory. The calculated percent of hydroxyl was 6.3, while the chemical analysis found 6.45 percent. The molecular weight of the reaction product, dissolved in a methyl ethyl ketone solution, was 2770.

Another sample of this reaction product analyzed 2.4 percent nitrogen as compared to a theoretical 2.6 percent. The reaction product itself was a fiscous, light colored oil.

The polymer reaction products, as prepared in the above illustrative example, containing pendant hydroxyl groups, can be cross-linked with typical cross-linking agents such as isocyanates or melamine resins. The following example is illustrative of the cross-linking ability of the novel polymers of the present invention.

To 2.65 grams (0.01 equivalent of hydroxyl) of the polymeric reaction product, as prepared in the above example, was added 1.24 grams (0.01 equivalent of NCO), of a polyisocyanate prepolymer produced by the reaction of tri(hydroxypropyl) glycerine with tolylene diisocyanate, having a —NCO content of 32 percent. To this mixture was added 3.0 grams of dioxane and 1.0 gram of tri(dimethylaminomethyl) phenol, an amine catalyst. After thorough mixing, the resultant mixture was cast on a steel panel and baked for 15 minutes at 300° F. The resulting film was glossy, solvent resistant, had a hardness of a 6H Double Eagle pencil and could withstand a front impact of 30 pounds and an impact of 10 pounds from the rear. The film was also quite tough and flexible in 2-3 mil thickness.

Similarly prepared films using a butylated melamine-formaldehyde resin in place of the polyisocyanate prepolymer as a curing agent were harder, very solvent resistant, but less flexible and poorer in impact properties.

In order to further illustrate the present invention 5.68 grams (0.1 equivalent of N-H) of alphachloroacetamide, 20.0 grams (0.1 equivalent) of a polyglycidyl ether of polypropylene glycol having an epoxy equivalent weight of 175-205, 0.25 gram (1 percent) sodium hydroxide powder were mixed in the same manner as the sulfonamide as illustrated above. This mixture was heated at 350° F. initially. At this temperature two phases (solid amide and liquid epoxy) are present. After 2 hours at 350° F., essentially one phase (very little solid) was present and the —NH bands at 2.95 and 3.1 microns in the infrared spectrum of the original mixture were essentially absent and a new band at 2.88 microns indicating —OH was observed. The carbonyl band was also considerably broadened, but still centered on 6.0 microns. After 4 hours at 350° F., only one phase was present, with no —NH bands in the IR spectra, however, a very strong —OH at 2.88 microns was present and the carbonyl band was broad and centered on 6.0 microns. The material was a brown, clear, very viscous material at 25° C.

The polymer reaction product as prepared in the above illustrative example, containing pendant hydroxyl groups, can be cross-linked with typical cross-linking agents such as isocyanates or melamine resins. The following example is illustrative of the cross-linking ability of the novel polymers of the present invention.

2.47 grams (0.01 equivalent) of the above polymer were mixed with 0.87 gram (0.01 equivalent) of toluene diisocyanate (TDI) and 1.5 grams dimethyl formamide diluent. These compounds were mixed, adding the TDI last. A film was cast on a bondarized steel panel and baked for 30 minutes at 300° F. to give a thermosetting, clear, orange coating, with a hardness of a 3-4 H Double Eagle pencil at 25° C. A 1 minute rubbing with acetone had little effect on the baked film. A blank containing no TDI, treated as above, was non-thermosetting, and was a viscous liquid at 25° C., and dissolved immediately in acetone.

The novel polymeric reaction products of the present invention are useful as intermediates for urethane foams, coatings, adhesives, and the like.

I claim:

1. A novel, curable resin composition having reactive hydroxyl groups prepared by reacting in the presence of catalytic amounts of an alkaline or Lewis acid catalyst for the amide-epoxide reaction essentially equivalent amounts of (1) a polyepoxide having essentially two epoxide groups per molecule selected from the group consisting of the diglycidyl polyether of polyhydric phenols, the diglycidyl polyether of polyalkylene oxides, m-diisopropenylbenzene diepoxide, divinylbenzene diepoxide and vinylcyclohexane dioxide, with (2) an amide comprising (a) aliphatic and aromatic carboxylic acid amides having the general formula

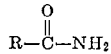

where R is an alkyl group of from 1 to 4 carbon atoms, an alkyl groups of 1 to 4 carbon atoms having attached thereto an electron withdrawing group selected from the groups consisting of —NO$_2$, —CN, and halogen, an aryl group or an aryl group having attached thereto an electron withdrawing group selected from the groups consisting of —NO$_2$, —CN, and halogen, or (b) aliphatic and aromatic sulfonamides having the general formula

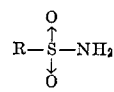

where R is an alkyl group of 1 to 4 carbon atoms or an aryl group.

2. The novel composition of claim 1 wherein the diglycidyl polyether of a polyhydric phenol is the diglycidyl ether of 2,2-bis(4-hydroxyphenyl) propane having an epoxy equivalent weight of 172-178.

3. The novel composition of claim 1 wherein the diglycidyl polyether of a polyalkylene oxide is the diglycidyl ether of polypropylene glycol having an epoxy equivalent weight of 175-205.

4. The novel composition of claim 1 wherein the diglycidyl polyether of a polyalkylene oxide is the diglycidyl ether of polypropylene glycol having an epoxy equivalent weight of 305-335.

5. The novel composition of claim 1 wherein the aromatic sulfonamide is benzene sulfonamide.

6. The novel composition of claim 1 wherein the aliphatic carboxylic acid amide is alpha-chloroacetamide.

7. The novel composition of claim 1 further comprising a crosslinking agent reactive with hydroxyl groups selected from the group consisting of polyisocyanates and melamine resins; said crosslinking agent added to provide about one equivalent for each equivalent of hydroxyl in said epoxide-amide reaction product.

8. The composition of claim 7 wherein said crosslinking agent is a butylated melamine-formaldehyde resin.

9. The article produced by crosslinking the composition of claim 7.

References Cited

UNITED STATES PATENTS 2,589,245   3/1952   Greenlee.
2,712,001   6/1955   Greenlee.

WILLIAM H. SHORT, Primary Examiner

T. PERTILLA, Assistant Examiner

U.S. Cl. X.R.

117—161; 260—47, 834